United States Patent [19]

Shimizu et al.

[11] Patent Number: 5,046,072

[45] Date of Patent: Sep. 3, 1991

[54] SIGNAL DISTRIBUTION SYSTEM

[75] Inventors: Fumihiko Shimizu, Yokohama; Taro Shibagaki, Tokyo, both of Japan

[73] Assignee: Kabushiki Kaisha Toshiba, Kawasaki, Japan

[21] Appl. No.: 490,328

[22] Filed: Mar. 8, 1990

[30] Foreign Application Priority Data

Mar. 14, 1989 [JP] Japan .................................. 1-61639

[51] Int. Cl.[5] .............................................. H04B 3/00

[52] U.S. Cl. .................................... 375/36; 370/85.1; 370/85.9; 333/32

[58] Field of Search ................. 375/36; 333/19, 28 R, 333/32, 124; 178/63; 370/85.1, 85.7, 85.9, 85.11; 455/6; 330/185

[56] References Cited

U.S. PATENT DOCUMENTS

| | | | |
|---|---|---|---|
| 4,445,048 | 4/1984 | Graham | 375/36 |
| 4,573,168 | 2/1986 | Henze et al. | 375/36 |
| 4,627,076 | 12/1986 | Staal et al. | 375/36 |

FOREIGN PATENT DOCUMENTS

| | | | |
|---|---|---|---|
| 2443770 | 8/1980 | France | 375/36 |

OTHER PUBLICATIONS

Interface Integrated Circuit, 1980, p. 130.

*Primary Examiner*—Benedict V. Safourek
*Assistant Examiner*—Young Tse
*Attorney, Agent, or Firm*—Oblon, Spivak, McClelland, Maier & Neustadt

[57] ABSTRACT

In a signal distribution system, a bus transmission path is provided on which at least one terminal of a pair of transmission lines terminates in a proper potential through a line-to-ground characteristic impedance $Z_0$. A pair of differential output terminals of at least one transmission circuit are connected to the corresponding pair of transmission lines on the bus transmission path to deliver differential transmission signals of a fundamental frequency f as output signals. A pair of differential input terminals of a respective one of a maximal number of reception circuits, N, are connected to the corresponding pair of transmission lines through a corresponding pair of branch resistors. The input terminal of the respective reception circuit has a characteristic of an input impedance $Z_L$ given below:

$$Z_L = R_L + 1/j2\pi fC_L$$

where $R_L$ and $C_L$ represent an effective resistive component and capacitive component, respectively, of the reception circuit. Here the values $R_1$, $R_2$ of the pair of branch resistors connecting the pair of differential input terminals to the corresponding pair of transmission lines are selectively so set as to satisfy the following equations:

$$R_1, R_2 < 1/\pi fC_L - R_L$$

$$R_1, R_2 > NZ_0 - |Z_L|.$$

2 Claims, 3 Drawing Sheets

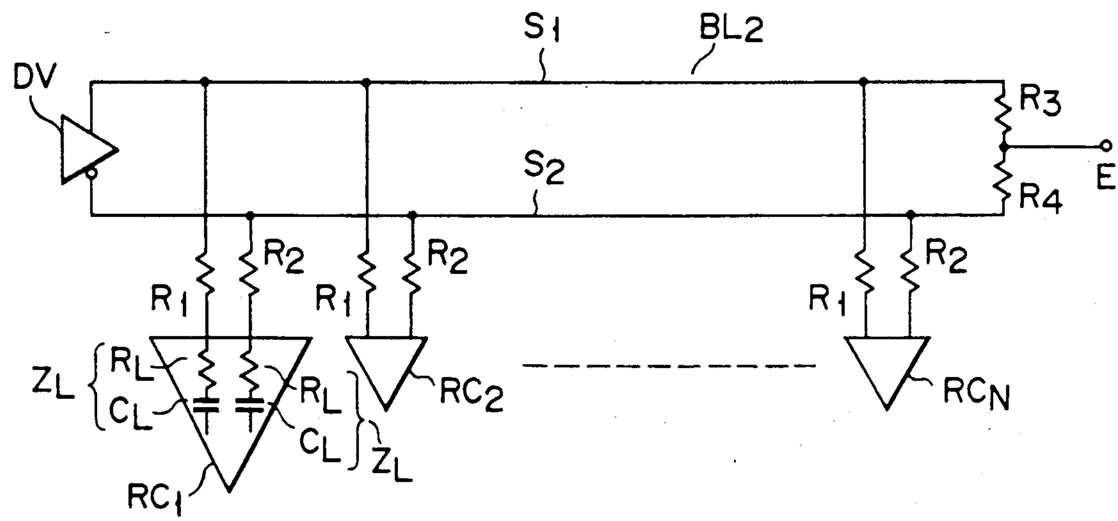
F I G. 4
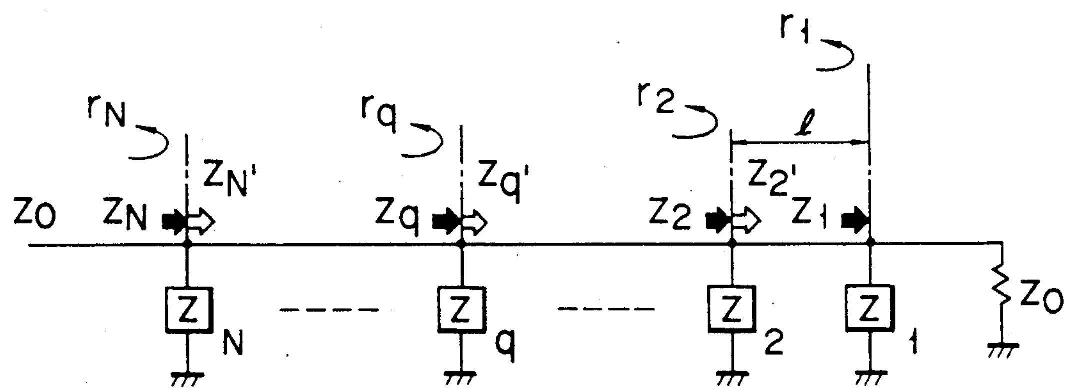
F I G. 5

SIGNAL DISTRIBUTION SYSTEM

BACKGROUND OF THE INVENTION

1. Field of the Invention

The present invention relates to a signal distribution system for effectively distributing a high-speed digital signal on a bus transmission path to many reception circuits without degrading its better characteristic.

2. Description of the Related Art

Conventionally, if a digital signal is to be distributively supplied to digital reception circuits $RC_1, \ldots, RC_N$ from more than one digital transmission circuit DV (one is shown in FIG. 1), a signal distribution system may be employed which supplies such a signal to the associated circuits via a bus transmission path $BL_1$ on which one terminal of transmission line S terminates in an output-determining potential E, as shown in FIG. 1, via a resistor $R_3$ equal to a line-to-ground characteristic impedance $Z_0$.

In a differential type signal distribution system, as shown in FIG. 2, a differential bus transmission path $BL_2$ is provided on which at least each terminal of a pair of transmission lines $S_1$, $S_2$ terminates in a potential E via resistors $R_3$ and $R_4$ equal to a corresponding line-to-ground characteristic impedance $Z_0$. A pair of differential output terminals of a digital transmission circuit DV and a pair of differential input terminals of each of N number of digital reception circuits $RC_1$ to $RC_N$ are connected to the transmission lines $S_1$ and $S_2$, respectively. A differential digital signal is delivered from the digital transmission circuit DV onto the transmission lines $S_1$ and $S_2$ and distributively supplied to the N number of digital reception circuits $RC_1$ to $RC_N$ over the differential bus transmission path $BL_2$.

If the fundamental frequency of the digital signal to be distributed becomes high in the aforementioned signal distribution system, the input impedance $Z_L$, particularly the parasitic capacitance $C_L'$, of the digital reception circuits $RC_1$ to $RC_N$ (only $RC_1$ is shown in detail) as shown in FIG. 2 cannot be disregarded, causing a drop in the input impedance and hence a mismatching among respective branch points. This provides a cause for a multiple reflection echo and degrades a signal waveform being transmitted.

Conventionally, as shown in FIG. 3, the differential input terminals of respective digital reception circuits $RC_1$ to $RC_N$ are connected respectively through branch resistors $R_1'$ and $R_2'$ to transmission lines $S_1$ and $S_2$ on a bus transmission path $BL_2$. By doing so, an input impedance equivalent to that of the respective reception circuit is increased to reduce a mismatching at the branch point and hence to suppress a multiple reflection echo. In this case it is common practice to selectively set the branch resistors $R_1'$ and $R_2'$ to be about one half the characteristic impedance $Z_0$ on the transmission path $BL_2$. This means enables the retentivity of a signal waveform to be greatly improved over that in the absence of any branch resistors.

If the N number of the reception circuit exceeds a certain value even in the presence of such resistors, the input impedance $Z_L$ of the reception circuit cannot be disregarded with respect to the characteristic impedance $Z_0$ on the transmission path $BL_2$, providing a cause for a mismatching. If the mismatching occurs, the multiple reflection echo is increased, resulting in a degraded signal waveform. In order to avoid such an inconvenience, it is only necessary to increase the value of the branch resistor with an increase in the N number of the reception circuits. Even in this case, however, the cutoff frequency determined by an impedance with the branch resistance initially built in is lowered and it is not possible to transmit a high-speed digital signal. Thus there is a limit on the increase of the branch resistance.

SUMMARY OF THE INVENTION

In the aforementioned conventional signal distribution system, even if a branch resistance of about one half the characteristic impedance $Z_0$ on the transmission path is provided on the branch point of the respective reception circuit, the waveform of a signal in transmission is degraded due to an increase in the N number of the reception circuits, failing to distribute a high-speed digital signal to the respective reception circuit.

It is accordingly the object of the present invention to provide a signal distribution system which can properly distribute a high-speed digital signal to many reception circuits by clearly defining such a branch resistance range as to allow the cutoff frequency and reflection coefficient of an N number of reception circuits to satisfy a requisite characteristic by selectively setting an input impedance with a capacitive component of the reception circuit initially built in accordance with the N number of the reception circuits to be distributively supplied with the digital signal and selecting the branch resistance within the above-defined branch resistance range.

According to the present invention, there is provided a signal distribution system, comprising:

a bus transmission path on which at least one terminal of a transmission line terminates in a proper potential through a resistor equal in value to a line-to-ground characteristic impedance $Z_0$;

at least one transmission circuit having an output terminal connected to the transmission line over the bus transmission path and delivering a transmission signal of a fundamental frequency f; and a maximal number of reception circuits, N, for receiving a signal transmitted to the bus transmission path, the input terminal of the respective reception circuit having a characteristic of an input impedance $Z_L$ $$Z_L = R_L + 1/j2\pi f C_L$$

where $R_L$ and $C_L$ represent an effective resistance component and capacitive component, respectively, of the reception circuit; and a number of branch resistors, N, interposed between the bus transmission path and the input terminal of the respective reception circuit and having their resistive value R so set as to satisfy the following equations:

$$R < 1/\pi f C_L - R_L$$

$$R > N Z_0 - |Z_L|.$$

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

FIG. 1 being an arrangement showing a single-ended signal distribution circuit, FIG. 2 an arrangement of a differential type signal distribution circuit and FIG. 3 an arrangement showing a differential type signal distribution circuit with branch resistors; and FIGS. 4 to 8 are an explanatory view for explaining an embodiment of the present invention; FIG. 4 being an arrangement showing a differential type signal distribution circuit; FIG. 5 showing an equivalent circuit of FIG. 4; FIG. 6 showing a differential type signal distribution circuit to which are connected a plurality of transmission circuit, FIG. 7 showing a single-ended signal distribution circuit including a single transmission circuit and FIG. 8 showing a signle-ended signal distribution circuit including a plurality of transmission circuits.

DETAILED DESCRIPTION OF THE PREFERRED EMBODIMENT

An embodiment of the present invention will be explained below with reference to FIGS. 4 to 8.

Figure 3:
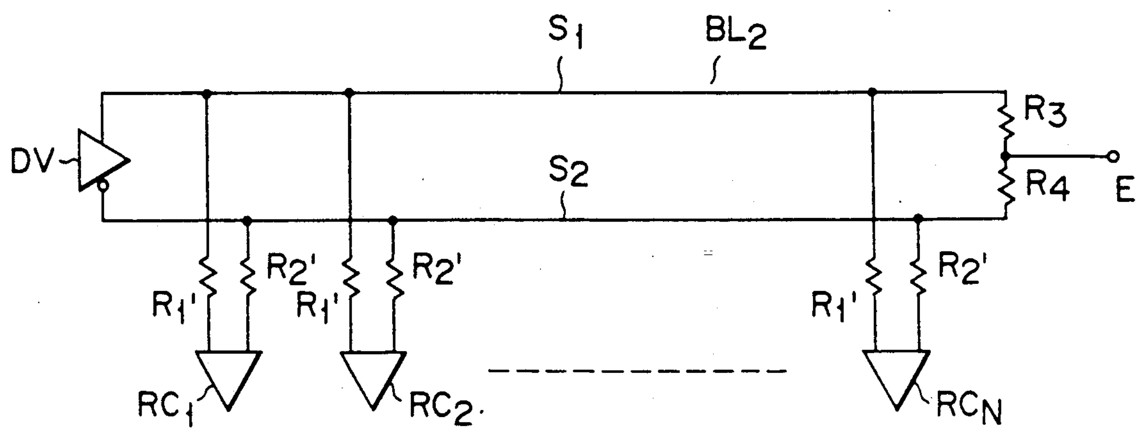

FIG. 4 shows an arrangement of a signal distribution circuit according to the present invention with identical references employed to designate parts or elements corresponding to those shown in FIG. 3. Here an explanation is given below principally in conjunction with different parts or elements.

The present invention is applied to a differential type signal distribution circuit which, upon the transmission of a high-speed digital signal of many channels, can reduce the cross-talk of one channel relative to an adjacent channel. That is, a differential bus transmission path $BL_2$ is of such a type that, with a line-to-ground characteristic impedance of transmission lines $S_1$, $S_2$ represented by $Z_0$, first terminals of the transmission lines $S_1$ and $S_2$ terminate in a potential E respectively through resistors $R_3$ and $R_4$ equal in value to that characteristic impedance. A digital transmission circuit DV has its paired differential output terminals connected to corresponding second terminals of the transmission lines $S_1$ and $S_2$. The respective differential input terminals of the N number of digital reception circuits $RC_1$ to $RC_N$ having the input impedance $Z_L$ are connected respectively through branch resistors $R_1$ and $R_2$ to the transmission lines $S_1$ and $S_2$.

The respective input impedances $Z_L$ of the digital reception circuits $RC_1$ to $RC_N$ are assumed to be equal to each other to facilitate an ease with which the present invention is understood and, here, $Z_L$ is represented by a complex form $$Z_L = R_L + 1/j2\pi f C_L$$

where $R_L$: a real resistive component of the reception circuit;
$C_L$: a capacitive component of the reception circuit; and
f: a fundamental frequency of a signal having channels.

Now suppose that, in the aforementioned arrangement, the N number of the reception circuits distributively supplied with the digital signal is increased. In order to suppress a mismatching as well as a multiple reflection echo, it is only necessary to increase the value of the branch resistors $R_1$ and $R_2$. However, this is accompanied with a drop in the cutoff frequency of the reception circuit and with a difficulty with which the high-speed digital signal is transmitted. Here, with a consideration paid to the condition under which the cutoff frequency is higher than the fundamental frequency f of the signal being transmitted, the values of the branch resistors $R_1$ and $R_2$ are selectively so set as to satisfy the following equation:

$$R_1 = R_2 < 1/\pi f C_L - R_L \quad (1)$$

Now let it be assumed that the aforementioned circuit arrangement is equivalent to a signal distribution circuit with an N number of loads Z connected at an interval l to a transmission path on which one end thereof terminates at ground through an impedance $Z_0$ as shown in FIG. 5. Let it also be assumed that the value of the load Z is equal to N times the impedance $Z_0$ on the transmission path. With, at any branch point q, $Z_p$ representing an impedance seen toward the terminating side, $Z_q'$ can be expressed by an equation (2)

$$Z_q' = Z_0(Z_{q-1} + Z_0 \tanh pl)/(Z_0 + Z_{q-1} \tanh pl) \quad (2)$$

provided that p denotes a transmission constant.

With the attenuation of a signal on the path disregarded, tanh pl can be approximated, as shown in equation (3), to:

$$\tanh pl \approx \tanh j2\pi l/\lambda \quad (3)$$

where l represents a branch-to-branch distance and λ the wavelength of the signal.

Since, in a normal state of use, $\lambda >> l$, the equation (3) can be approximated to zero and $Z_q'$ in equation (2) can be treated as being equivalent to $Z_{q-1}$. For this reason, the impedance $Z_q$ seen from the branch point q, together with the load Z, toward the terminating side can be reduced to:

$$Z_q = Z_0 N/(N+q) \quad (4)$$

As evident from the above, the reflection coefficient $r_q$ of the branch point q as shown in FIG. 5 is given by the following equation (5) and the reflection coefficient $r_N$ on the N-th branch point can be found as given below:

$$r_q = q/(2N+q) \quad (5)$$

$$r_N = N/(2N+N) = \tfrac{1}{3} \quad (6)$$

As seen from the above, if the impedance of the load Z is equal to N times the impedance $Z_0$ on the transmission path, then even in the branch point whose reflection is maximal the reflection coefficient can be suppressed below $\frac{1}{3}$, that is, the return loss can be suppressed below −10 dB. Taking into consideration the input impedance $Z_L$ of the reception circuit in the signal distribution circuit shown in FIG. 4, the branch resistors $R_1$ and $R_2$ are selectively be set to satisfy the following equation (7) under the aforementioned conditions:

$$R_1, R_2 > NZ_0 - |Z_L| \quad (7)$$

According to the aforementioned signal distribution system, upon the connection of many reception circuits to the differential bus transmission path capable of lowering crosstalk, it is possible to prevent a lowering of the cutoff frequency resulting from an increase in the number of the reception circuits simply by selecting the values of the branch resistors $R_1$, $R_2$ to satisfy the equation (1). Simply by selectively setting the branch resistors $R_1$, $R_2$ to satisfy the equation (7) it is possible to prevent an increase in the reflection coefficient resulting from an increase in the number of the reception circuits. It is thus possible to properly distribute a high-speed digital signal to many reception circuits.

In practical application, in order to improve the rise and fall times of a transmission signal waveform with the cutoff frequency placed at a high level, it is necessary to design a differential bus transmission path $BL_2$ by making the branch resistors $R_1$, $R_2$ at as small a level as possible to satisfy the equation (7) and, at the same time, making the characteristic impedance $Z_0$ in the aforementioned equation at as small a level as possible. Further, if the input impedances of the respective reception circuits $RC_1$ to $RC_N$ vary, it is only necessary to selectively set the branch resistors $R_1$, $R_2$ of the individual reception circuits under the conditions of the aforementioned equations (5) and (7).

Figure 6:
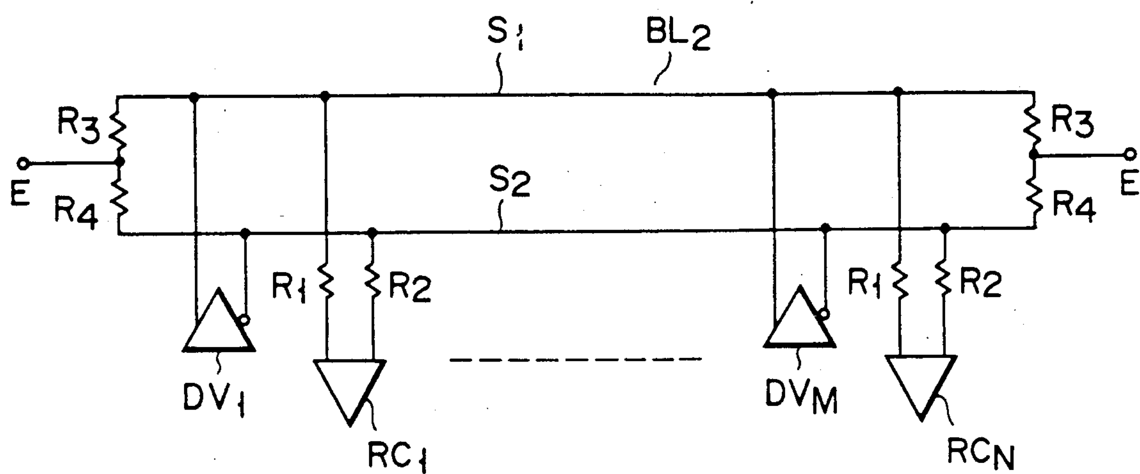
Figure 7:
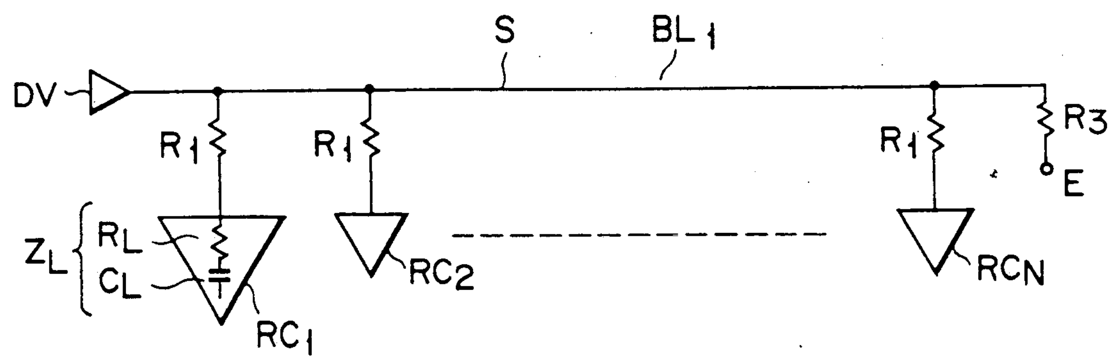
Figure 8:
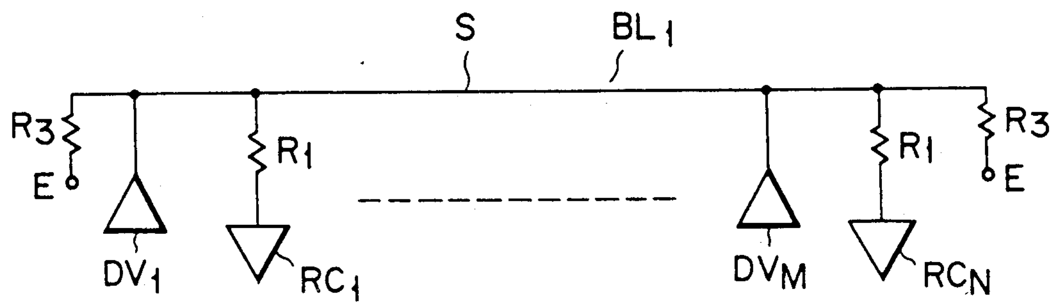

Although the aforementioned embodiment has been explained as having one signal transmission circuit DV, the same advantage can also be obtained even if an N number of signal transmission circuits is connected to transmission lines $S_1$, $S_2$ in a manner shown in FIG. 6. If no consideration is paid to any cross-talk, then one transmission circuit DV may be connected to a single-ended transmission path $BL_1$ as shown in FIG. 7 and a plurality of transmission circuits to a single-ended transmission circuit $BL_1$ as shown in FIG. 8 and, by so doing, the same advantage as set out above can be obtained by selectively setting the branch resistor R for the respective reception circuits $RC_1$ to $RC_N$ to satisfy the following equations:

$$R < 1/\pi f C_L - R_L \quad (8)$$

$$R > NZ_0 - |Z_L| \quad (9)$$

Figure 1:
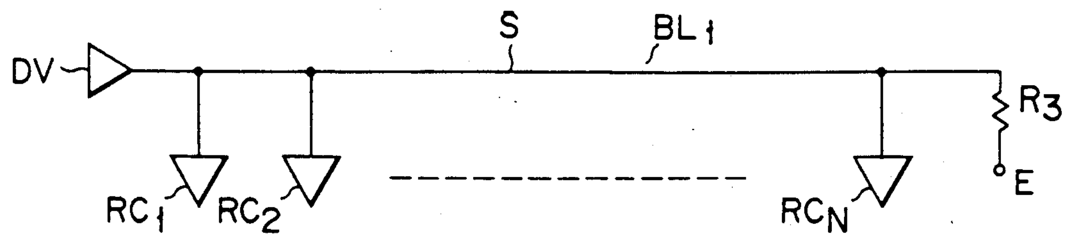
FIGS. 1 to 3 are an explanatory view for explaining a conventional signal distribution system.
Figure 2:
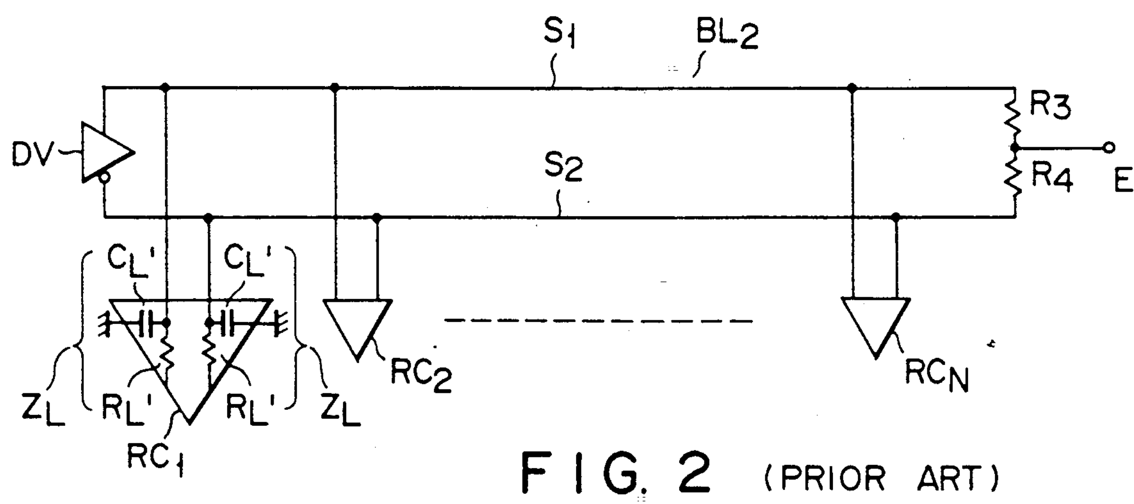

In FIG. 6 identical reference numerals are employed to designate parts or elements corresponding to those shown in FIG. 4 and any further explanation is omitted. In FIGS. 7 and 8, identical reference numerals are employed to designate parts or elements corresponding to those shown in FIG. 1 and any explanation about it is omitted for brevity's sake.

The present invention can very advantageously be applied to a broardband ISDN which requires a distribution/exchange equipment for distributing many high-speed digital signals in particular to many reception circuits without losing its better characteristic. It is thus possible to obtain a signal distribution apparatus of high reliability at low costs. It is also possible to detachably connect "live" wires to the reception circuit readily and properly and hence to ensure an excellent maintainability.

According to the present invention, taking into consideration an input impedance with a capacitive component of the reception circuit initially properly set in accordance with a maximum number of reception circuits, N, distributively supplied with digital signals, a branch resistance range is clearly determined to allow the cut-off frequency and reflection coefficient of the reception circuit to satisfy a requisite characteristic and, with branch resistors selectively set to be within that determined range, it is possible to properly distribute a high-speed digital signal to many reception circuits and further to readily and properly connect "live" wires to the reception circuits detachably.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A signal distribution system in a substrate on which an electronic circuit is formed, comprising:

a bus transmission path which has such a length as to be able to neglect an influence of wavelength of a transmission signal and on which at least one terminal of a transmission line terminates in a proper potential through a resistor equal in value to a line-to-ground characteristic impedance $Z_0$;

at least one transmission circuit having an output terminal connected to the transmission line over the bus transmission path and delivering a transmission signal of a fundamental frequency f;

a plurality of reception circuits, N, for receiving the transmission signal from said transmission circuit through said bus transmission path, an input terminal of each of said reception circuits having a characteristic of an input impedance $Z_L$ $$Z_L = R_L + 1/j2\pi f C_L$$

where $R_L$ and $C_L$ represent a real resistive component and a capacitive component, respectively, of the reception circuit; and a plurality of branch resistors, N, for connecting a plurality of branch points, N, which are spaced away from one another by distance l on said bus transmission path to the input terminals of said plurality of reception circuits, said distance l satisfying the following equation with respect to wavelength λ of a basic frequency f of the transmission signal:

$$\lambda >> l$$

and said branch resistors each having a resistive value R so set as to satisfy the following relations:

$$R < 1/\pi f C_L - R_L$$

$$R > NZ_0 - |Z_L|.$$

2. A signal distribution system comprising:

a bus transmission path which has such a length as to be able to neglect an influence of wavelength of a transmission signal and on which at least one terminal of a pair of transmission lines terminates in a proper potential through a resistor equal in value to a line-to-ground characteristic impedance $Z_0$;

at least one transmission circuit having a pair of differential output terminals connected to a corresponding pair of transmission lines and delivering a differential signal of a fundamental frequency f;

a plurality of reception circuits, N, having a pair of differential input terminals, for receiving the transmission signal from said transmission circuit through said pair of transmission lines of said bus transmission path, an input terminal of each of said reception circuits having a characteristic of an input impedance $Z_L$ $$Z_L = R_L + 1/j2\pi fC_L$$

wherein $R_L$ and $C_L$ represent a real resistive component and a capacitive component, respectively, of the reception circuit; and one pair of branch resistors in a plurality of sets, N, for connecting a pair of branch points in a plurality of sets, N, which are spaced away from each another by distance l, on said pair of transmission lines of said bus transmission path to said pair of input terminals of said plurality of reception circuits, said distance l satisfying the following equation with respect to wavelength λ of a basic frequency f of the transmission signal;

$$\lambda >> l$$

and said branch resistors each having resistive values R1 and R2 so set as to satisfy the following relations:

$$R1, R2 < 1/\pi fC_L - R_L$$

$$R1, R2 > NZ_0 - |Z_L|.$$

* * * * *